US008209660B2

(12) United States Patent
Sundararajan et al.

(10) Patent No.: US 8,209,660 B2
(45) Date of Patent: Jun. 26, 2012

(54) MODEL DRIVEN SOFTWARE

(75) Inventors: Partasarathy Sundararajan, Chennai (IN); Shyamala Jayaraman, Chennai (IN); Suresh Sathiavageeswaran, Chennai (IN); Madusudanan Rajaraman, Chennai (IN); Srinivasan Ramaswamy, Chennai (IN); Krishnamoorthy Meenakshisundaram, Chennai (IN); Raghuram Devalla, Chennai (IN); Kannappan Gopalsamy, Chennai (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 429 days.

(21) Appl. No.: 12/616,835

(22) Filed: Nov. 12, 2009

(65) Prior Publication Data

US 2010/0058287 A1    Mar. 4, 2010

Related U.S. Application Data

(63) Continuation-in-part of application No. 11/048,078, filed on Feb. 1, 2005, now abandoned.

(51) Int. Cl.
 *G06F 9/44* (2006.01)
(52) U.S. Cl. .......................... 717/105; 717/121; 717/168
(58) Field of Classification Search .................... 717/105
 See application file for complete search history.

(56) References Cited

U.S. PATENT DOCUMENTS

| | | | | |
|---|---|---|---|---|
| 6,405,364 B1 * | 6/2002 | Bowman-Amuah | .......... | 717/101 |
| 6,442,557 B1 * | 8/2002 | Buteau et al. | ................ | 705/7.29 |
| 7,073,164 B1 * | 7/2006 | Knowles | ........................ | 717/102 |
| 7,149,734 B2 * | 12/2006 | Carlson et al. | ................ | 717/120 |
| 7,191,429 B2 * | 3/2007 | Brassard et al. | ............... | 717/104 |
| 7,213,232 B1 * | 5/2007 | Knowles | ........................ | 717/121 |
| 7,322,024 B2 * | 1/2008 | Carlson et al. | ................ | 717/120 |
| 2004/0078777 A1 * | 4/2004 | Bahrami | ........................ | 717/105 |
| 2004/0221260 A1 * | 11/2004 | Martin et al. | .................. | 717/104 |
| 2008/0120129 A1 * | 5/2008 | Seubert et al. | .................... | 705/1 |
| 2009/0222793 A1 * | 9/2009 | Frank et al. | .................... | 717/114 |

OTHER PUBLICATIONS

Elvesaeter et al., "Towards an Interoperability Framework for Model-Driven Development of Software Systems," Object Management Group, 2005, 12pg.*
Hildenbrand et al., "A Model-Driven Approach to Business Software Engineering," Univ. of Mannheim, 2004, 6pg.*
Schiefer et al., "Event-Driven Rules for Sensing and Responding to Business Situations," ACM, 2007, 8pg.*
Yang, Ying, "Change Management in Object-Oriented Databases," IEEE, 1993, 8pg.*

* cited by examiner

*Primary Examiner* — Li Zhen
*Assistant Examiner* — Ryan Coyer
(74) *Attorney, Agent, or Firm* — Prakash Nama; Global IP Services, PLLC

(57) ABSTRACT

A system and method for model driven software is disclosed. In one embodiment, the method of handling changes to a software system in a business environment includes capturing customer requirements of the software system in a schema, modeling business-software architecture of the software system in a first level of the schema, modeling design architecture of the software system in a second level of the schema, defining events that connect the first level and second level of the schema, defining links that represent interactions between the user interfaces, defining integration services for each of the events, mapping each element in the first level to a corresponding one of elements in the second level using the events, links and integration services, creating a knowledge repository with a traversable user interface representing the mappings, identifying changes to the software system, and analyzing impact of the changes using the knowledge repository.

20 Claims, 9 Drawing Sheets

FIG. 5

RECORD IMPACT – PROCESS FLOW

EVENT

| CUSTOMER ID | NEW TEST | CUSTOMER NAME | NEW TEST |
|---|---|---|---|
| PROJECT ID | NEW TEST | PROJECT NAME | NEW TEST |
| WORK REQUEST ID | | WORK REQUEST COMMENTS | |
| BUSINESS PROCESS ID | | BUSINESS PROCESS NAME | |
| IMPACTED STATUS | | | |

[GET DETAILS]

EVENT DETAILS

TOTAL ROWS : 0

| # | IMPACT TYPE | EVENT TYPE | EVENT NAME | EVENT DESCRIPTION (SHORT) | EVENT DESCRIPTION | FLOW TYPE | EXECUTION SEQUENCE |
|---|---|---|---|---|---|---|---|
| 1 | NO CHANGE | ENTRY | | | | INFORMATION | START |
| 2 | NO CHANGE | ENTRY | | | | INFORMATION | START |
| 3 | NO CHANGE | ENTRY | | | | INFORMATION | START |
| 4 | NO CHANGE | ENTRY | | | | INFORMATION | START |
| 5 | NO CHANGE | ENTRY | | | | INFORMATION | START |
| 6 | NO CHANGE | ENTRY | | | | INFORMATION | START |
| 7 | NO CHANGE | ENTRY | | | | INFORMATION | START |
| 8 | NO CHANGE | ENTRY | | | | INFORMATION | START |
| 9 | NO CHANGE | ENTRY | | | | INFORMATION | START |
| 10 | NO CHANGE | ENTRY | | | | INFORMATION | START |

[SAVE]

MODEL DRIVEN SOFTWARE

RELATED APPLICATIONS

Benefit is claimed under 35 U.S.C. 120 to U.S. Non Provisional application Ser. No. 11/048,078, entitled "MODEL DRIVEN SOFTWARE" by inventor Partasarathy Sundararajan et al., filed Feb. 1, 2005, which is herein incorporated in its entirety by reference for all purposes.

FIELD OF THE INVENTION

The present invention relates to use of models in the software environment, and in particular, system and method for model driven software to analyze the impact of changes in a software system.

BACKGROUND

Post implementation maintenance may be the longest and the most time consuming aspect of owning software during its life cycle. While normal system lifecycle continues to shrink (at the present time it is approximately 7 years) due to the speed at which changes occur in business and technology environments, the maintenance phase still extends over the entire lifetime of the system—whatever the length of that lifetime may be. And while maintenance is important, managing changes is not restricted to the post implementation phase in the software lifecycle. A major reason attributed to project schedule slippage and cost overruns is the instability of requirements and changes to these requirements during the development phase. These changes may relate to technological and/or business issues.

During a system lifecycle, handling changes in software is inherently complex. This complexity arises because of the number of individual interacting modules and peripherals in the system, a poor understanding and availability of reliable engineering information about the system, the fact that connection semantics between modules and peripherals are not governed by physical laws, and the myth that software can be changed at will owing to the fact that its nature is non-physical. Irrespective of the complexity of changes, most issues in software maintenance relate to changes in the business environment and to managing the knowledge needed to change and control the configuration of the artifacts (i.e., executable modules). Complete documentation of the software systems is essential to conduct a proper impact analysis and to understand the effect of changes and the viability of alternatives. Lack of a clear identification of all impacted items leads to a poor estimation of the effort needed to change a system and quite often results in costly system problems.

In the software lifecycle, managing changes brought about by technological evolution is very different from, for example, managing changes brought about by software feature upgrades. One reason for this is that the capability to tackle changes in technology environments goes deep into the architectural principles of systems and whether the changes in the technology environment can be successfully mapped across the present implementation of the system.

Consequently, any software system needs a thorough analysis prior to implementation, including implementation of system upgrades. However, identification of the impact of additions, enhancements, changes and/or deletions at an early stage of the project lifecycle is often not done, or it is not done with clarity and standardization. As a result, there is no end to end identification of this impact from the change requirements to the final delivered artifact. In addition to identifying the impact, the ability to address the size and cost of the software, and the time to complete the set of impacted artifacts, is critical, yet not always properly addressed during system changes.

During system change implementations, it should be kept in mind that model based software artifacts may spread over different layers of implementation. Moreover, the control of changes in artifacts and rolling out these changes to the installed sites at the present time is mostly a manual process and can be troublesome.

Currently, the foregoing problems are addressed in conventional manual process approaches (such as quality systems and system documentation) and/or configuration management tool-based approaches to manage changes to the delivered artifacts.

BRIEF DESCRIPTION OF THE DRAWINGS

Embodiments of the present invention are illustrated by way of an example and not limited to the figures of the accompanying drawings, in which like references indicate similar elements and in which:

FIG. 5 illustrates another example of a model browser that can be used in connection with an embodiment of the invention.

FIG. 6 illustrates an example of an interface reporting the impact status.

FIG. 7 illustrates another example of an interface reporting the impact status.

Other features of the present embodiments will be apparent from the accompanying drawings and from the detailed description that follows.

DETAILED DESCRIPTION

A method and system for model driven software to analyze the impact of changes in a software system is disclosed. In the following description, for purposes of explanation, numerous specific details are set forth in order to provide a thorough understanding of the present invention. It will be evident, however, to one skilled in the art that the present invention may be practiced without these specific details.

The terms 'task', 'business task' and 'action' are used interchangeably throughout the document.

Figure 1A:
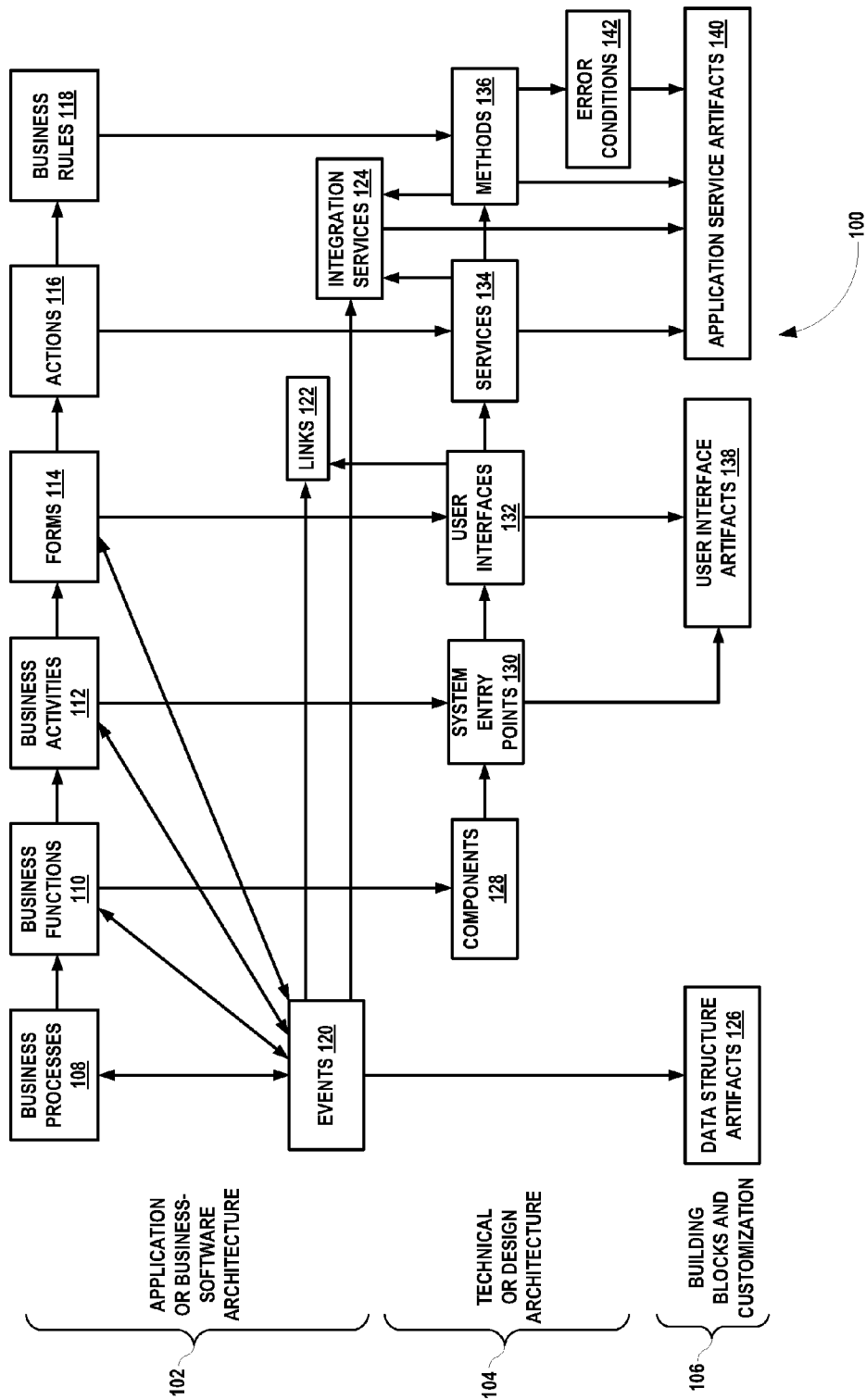
FIG. 1A is a schema for gathering requirements and for creating and managing enterprise software from the gathered requirements, in accordance with one example embodiment of the present invention.

FIG. 1A is a schema 100 for gathering requirements and creating and managing enterprise software from the gathered requirements in accordance with one example embodiment of the present invention. The schema or software structure specification 100 includes multiple levels of abstraction of requirements. The first level 102 is an application or business-software architecture level. The first level 102 is used to define the high level requirements in context relevant syntax. The multiple levels of abstraction of requirements are stored in a database schema/software structure schema (e.g., the software structure schema 212 of FIG. 2) form in one embodiment, such that lower levels, progressing toward actual coding are linked to higher levels. A second level 104 is used to represent a technical or design architecture of the first level 102. The second level 104 serves as an intermediate link between the first level 102 and a third level 106 that represent actual building blocks and technology specific customization.

The first level 102 is a process expression level. The first level 102 includes a plurality of elements or units, each of which stores various aspects of specifications derived from the requirements and software built to those specifications. In some embodiments, the first level 102 includes business processes 108 that define requirements at a level compatible with thinking processes of business-requirements experts. In some embodiments, the business processes 108 are divided into a first five units including business functions 110, business activities 112, forms 114, actions 116, and business rules 118.

An example of a business process might be sales order processing for a business. The business functions 110 may include purchase requisitioning, approval and purchase order dispatch. The business activities 112 may include an acknowledgement, get best quote, release purchase order. The forms 114 may be defined in terms of show all pending purchase orders for approval, an approval screen, and others. The actions 116 may include things like fetch next purchase order for approval, link to next page, send acknowledgement, or send rejection.

The business rules 118 may include things like "if no request, tell user x". As illustrated, the first level 102 contains a textual description of the business or other process to be implemented by a computer system or otherwise electronically. The descriptions take the form of text that is very relevant to one who is designing the business process 108. In one sense, it is an abstract representation of the actual code that will be written, but in another sense, it separates the structure of the implementation from the expression of the process.

The second five units represent the design architecture 104, and include, in some embodiments, components 128 that represent the basic software units of this approach, system entry points 130, user interfaces, 132, services 134, and methods 136.

In some embodiments, each of the first five units is mapped to a corresponding one of the second five units, e.g., business functions 110 are mapped to components 128, business activities 112 are mapped to system entry points 130, forms 114 are mapped to user interfaces 132, actions 116 are mapped to services 134, and business rules 118 are mapped to methods 136. In some embodiments, error conditions 142 are provided for methods 136.

Further, the business processes 108 and associated events 120 represent operational flow across the organization for which the software is being developed. The events 120, include entry and exit events to the constituent functions 110, activities 112, and forms 114, are connectors that define flow of control or interfaces between other units. The business activities 112 and their associated events 120 represent the operational flow across a unit within the organization. The forms 114 and their associated events 120 represent specified interface map for the systems and software being developed.

Links 122 are formed from mapping of the events 120 that represent interconnections, or from the user interfaces 132. Integration services 124 are formed from mapping of the events 120, services 134, and/or methods 136.

Furthermore, the third level 106 includes building blocks and customization. Data structure artifacts 126 are generated from the events 120 and the components 128, user-interface artifacts 138 are generated from the system entry points 130 and the user interfaces 132 of the second five units, and application service artifacts 140 are generated from the services 134 and the methods 136. In some embodiments, application service artifacts 140 are also generated from the integrations services 124 and the error conditions 142.

In accordance with the above described embodiments with respect to FIG. 1A, model based software solutions involve approaches and implementations in which every significant part of software development lifecycles can be modeled as data and persisted throughout a system. In one embodiment of the invention, model based software solutions provide capabilities that enable users to perform various steps in the software development lifecycle. Specifically, persisted data are passed from upstream processes to downstream processes in the operation and maintenance of the software system.

Consequently, an embodiment of the invention uses model strategy for both storage and deployment functions. It demarcates the layers of storage into the business-software architecture nodes/artifacts 102, technical nodes/artifacts 104, and building blocks and customization nodes/artifacts 106. This allows for defining each of these layers as master data information in artifact packaging.

The model hierarchy at a requirements management stage has information on the business processes 108, business functions 110, components 128, business activities 112, forms 114, tasks/actions 116 and business rules 118. System attributes that need to be available are captured and stored in the model. A traversable user interface prototype, use case report and flash based review form the deliverable at this stage. The next stage of engineering deals with the business functions 110 and the components 128 as its initial basis for work. That stage has information on the detailing of the business flow rules 118, messages that become errors or information signs, tasks/actions 116 detailed as the services 134, cross component interactions for data updates through the integration services 124, and the methods 136 that solve the data flow implemented mostly as stored procedures. An advantage this model has is that the business object or the integrated business object enables ease of unit testing by creation of a software structure schema (e.g., the software structure schema 212 of FIG. 2) using the model information of the service/method structures and applying the minor changes to fit the needs.

The third level 106 (e.g., the technology layer or the building blocks and customization) of the model contains details pertaining to Web, application, and resource management artifacts, with the deliverables listed and stored in the database for packaging and installation. Web layer artifacts may be HTML and JavaScript (JS) files. An embodiment that is a Microsoft version could have Dynamically Linked Libraries (DLL's) and Java versions of the deliverable (with additional class files). In addition to the deliverables, i.e. the executable code, generated source code is stored as binary large objects (BLOBs) in the resource management area of the model. This is possible owing to a clear distinction between the customer and the project worked upon, with supporting evidence of the version and "Requirements Change Notice (RCN)" as supporting attributes to store and retrieve the data for use at any point in time. Facilities for minor changes can be recorded for individual artifacts through proper routes. A release manager controls the list of artifacts that can be allocated to work on, thereby easing the confusion that may otherwise arise out of simultaneously working on the same artifact in response to more than one change notice. With reviews and checkpoints in place for each artifact in each of the model based processes, maintenance and support become easier. A question as to what is not there in the model will highlight the information set that this artifact packaging will hold before it is rolled out to any client site.

Releases of software, and in particular maintenance releases, using this model are much easier to implement. One reason for this is that the generated code is syntactically precise. An impact analysis is performed for the artifacts of the model at the different layers, and estimates of these analyses are collected. Then, the releases are scheduled without much effort because most of the engineering changes are template based, and final code generation of the affected areas are based only on the finalized list of impacted artifacts. Test cases are also generated based on the model information with provisions for test data for validation to ensure that a robust and a scalable application is delivered.

A model based infrastructure enables a history of information to be available through proper configuration management. The advantages of model driven releases and implementations are that they have sets of these data as "versions" of information with proper documentation for each set. Security is enforced at each of the artifacts, based on "ownership" and ability for supervisory roles to overrule the same as checkpoints for ease of use in release and delivery. The model driven releases also provide re-usability of existing software artifacts and in turn make the enhancements on already delivered software artifacts easier.

The management of software and/or system changes brought about by maintenance or other reasons is aided by several features of one or more embodiments of the invention. First, the formal representation of the associated software structure specification serves as a structured knowledge base representation scheme. Second, the system in this embodiment has technology independent architectural elements that guide the software specifications. Third, this embodiment has standard processes to operate the software development lifecycle.

Figure 2:
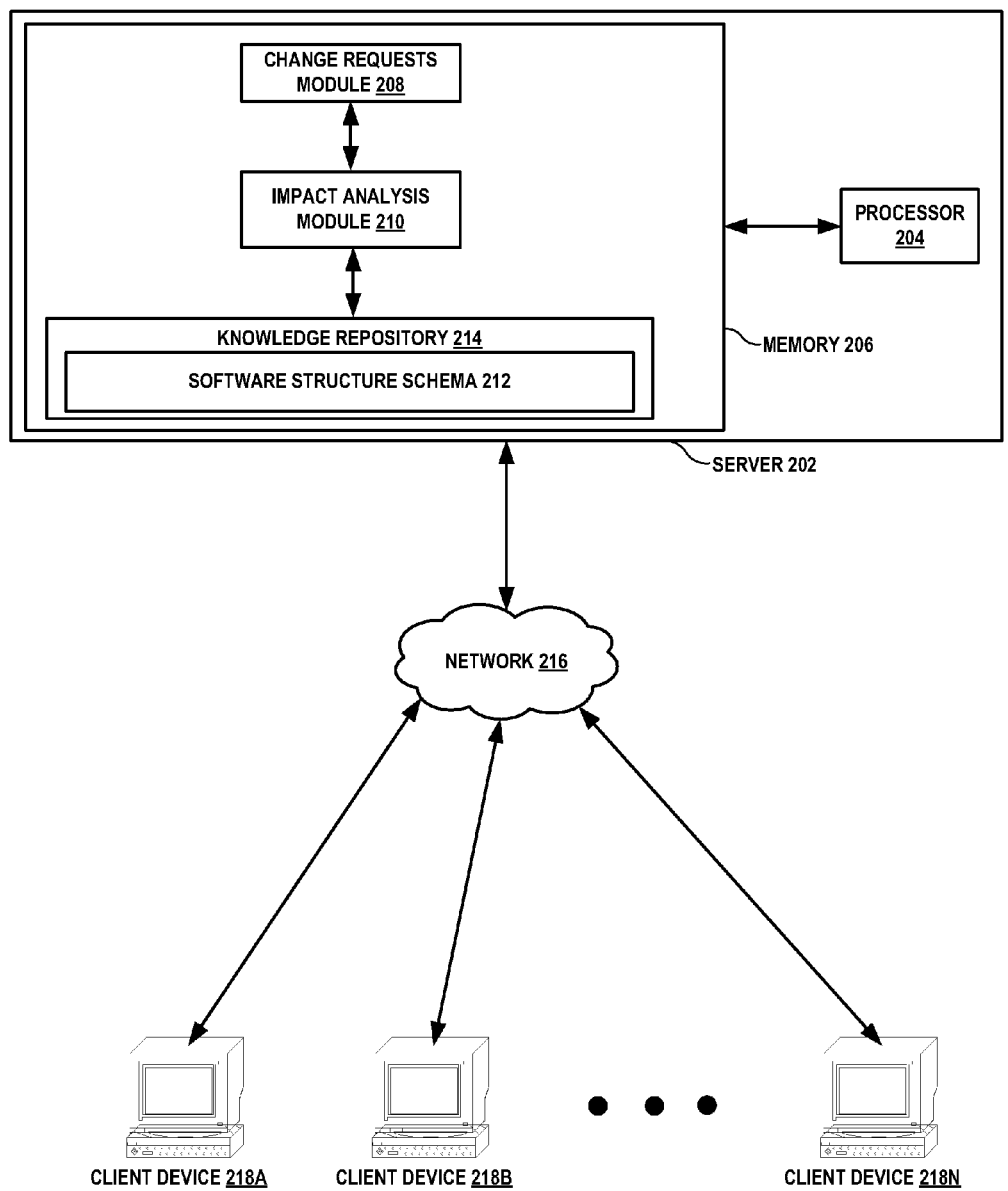
FIG. 2 is a block diagram depicting a system having a server in accordance with one example embodiment of the present invention.

In one example embodiment, when a business requirement changes (e.g., the addition of a new report or the change of an existing report), an embodiment of the invention analyzes the impact of a proposed software/system solution to the business change using a knowledge repository (e.g., the knowledge repository 214 of FIG. 2). First, this embodiment identifies the impacted items (i.e. artifacts) through the connections persisted in the knowledge repository. This analysis is conducted until no new additions appear on the list of additional items to change. The list is then subjected to an estimation of the effort required to implement the changes. If the impact is estimated to be too great, a decision may be made to attempt a different alternative. This impact analysis approach provides for a "what if" analysis before committing to a decision.

In cases where the underlying technology or platform changes, rather than the software, the knowledge repository created in terms of fundamental architecture elements lends itself to looking at a proper technology mapping without having to recreate the knowledge base again.

The built in lifecycle processes enable smooth handover between the functions belonging to various phases and ensures that the listed items are the ones that are changed. Eventually, the artifacts delivered as part of the change are correctly associated with repository elements aiding in sophisticated maintenance management.

In one embodiment, engineering entities function together to invoke database stored procedures that are associated with design methods. Each such stored procedure in turn invokes different stored procedures. Each such stored procedure accesses data through interface views provided by other components or from their own data store. The main power of a model based development environment then is to have a clear traceability of system development and design from the inception of the problem solving phase to the end of the engineering phase where the code gets delivered to the end user. These processes are tightly integrated with the planning and rollout processes.

Given these requirements for implementation with Microsoft technology platform, the mapping between the first, second and third level is given in the following Table 1.

TABLE 1

| Requirements specification Business architecture elements | Mapped Design-specification provides corresponding Technical architecture elements | Implementation in the sample technology architecture (for example, Microsoft-based technology) |
|---|---|---|
| Business functions | Components, Business Objects | Tables in a RDBMS-like MS SQL server |
| Business activities | System entry points | Menu items implemented using ASP, HTM |
| User interfaces or forms | Screens | HTML pages, Active server pages |
| Tasks or actions performed on the user interface | Services | COM+ DLLs implementing the service behavior using Visual basic |
| Business rules | Process sections, Methods | Stored procedure for business logic, VB code for business logic |
| Events | Links, Integration services, Interface business objects | Links are implemented as Hyperlinks in HTM for UI lookup. Interface business objects are implemented as stored procedures, views, for data lookup, Integration services are implemented as COM+ DLLs for integration with external systems. |

For different technology platforms and recommendations, the mapping can be suitably specified to ensure implementation does not violate the architecture guidelines.

This provides the following advantages: a clear technology-implementation mapping that preserves adherence to architecture guidelines. Future re-implementation in other technology platforms can be driven from the same set of specifications and specific mapping. The clear separation of concern between the architect, engineer and implementer leads to better productivity and discipline. The architect's concerns now focus on business needs without being constrained by the implementation methodology or technology. The engineer's concerns are now to design the system to address the business needs without being constrained by technology. The implementer's concerns are now for developing the system using a particular technology to address the business needs based on the design.

Figure 1B:
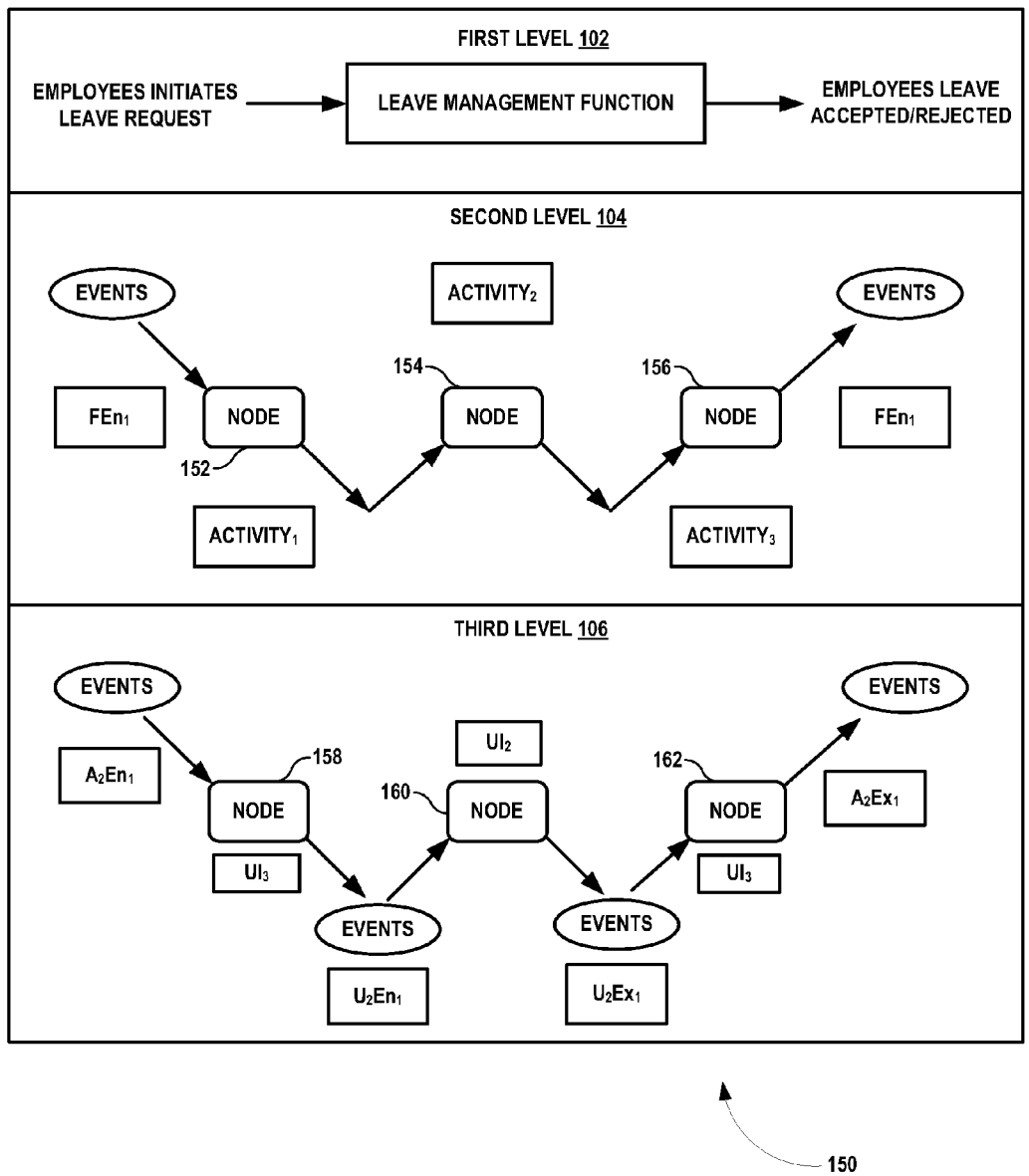
FIG. 1B represents exemplary connections within and across levels, which are used as the software is being developed, engineered and tested, in accordance with one example embodiment of the present invention.

FIG. 1B represents exemplary connections 150 within and across levels, which are used as the software being developed, engineered and analyzed in accordance with one example embodiment of the present invention. A first level corresponding to the first level 102 in FIG. 1A in the diagram creates a process flow by depicting entry events and exit events to the constituent functions from/to other functions in the same process or across processes. The standard connective elements (which connect the standard architectural elements) are events that are triggered by and/or handled by the various architectural elements (FEn1, FEx1, AEn1, AEx1, UEn1, UEx1). FEn1 represents an entry event handled by function 1. FEx1 is an exit event generated by function 1. AEn1 is an entry event handled by activity 1. Events are represented by ovals in FIG. 1B. AEx1 is an exit event generated by activity 1. UEn1 is an entry event handled by User Interface 1. UEx1 is an exit event generated by user interface 1.

The second level 104 for activity flow uses the entry event for the corresponding functions as the start event to create the set of activities and interactions through events to reach the end events for the function. Each activity node 152, 154 and 156 is expanded along the same principles to depict the user interface (UI) flow (e.g., forms) needed to complete the activity. The next level 106 represents tasks at task nodes 158, 160 and 162 on the UI and subsequently the business rules to be implemented for the tasks expanded. Events are again represented by ovals.

This approach creates a complete map of the system behavior up to the business rules/policies level and will be the driver for engaging with customers for whom the code is being written. The nodes translate to relevant nodes in engineering. The events that connect them are classified and translated to information-exchange events (these are implemented as UI look ups, and data look ups at the SP level for performing the validations), and transfer-of-control events (these are implemented as integration services across component boundaries and data updates across boundaries for local storage inside the component boundary).

Events are now described with respect to an example business process in FIG. 1B. An event is a stimulus that triggers a function/activity/form. The function/activity/form responds to the stimulus and results in an response. The stimulus is referred to as an entry event and the response as an exit event. An example of an entry event at the function level is "Employee initiates leave request." The function that responds to this stimulus is a leave-management business function.

An example of an exit event is "Employee leave request approved/rejected." UI lookups are user interfaces provided to look up certain reference information in the course of completing a transaction. For example, during the processing of a leave authorization, the supervisor could look up the leave balance of the employee. Data lookup is the reference information used to validate data in the database. An example of such lookup is the validation of employee eligibility for the type of leave applied for. Stored-procedure-level look up is used where multiple business rules need to be implemented in a common environment.

An event within the system querying for information is an information-exchange event, e.g., checking an available-to-promise date from a production schedule, or checking on vendor rating for a purchase order creation. A transfer-of-control event is an event within the system that transfers information and control to the next function in a business process, e.g., items ready for packing to be handled by the packing function, or invoice to be raised for item purchased to be handled by accounts payable.

The mapping of the nodes and events to the underlying engineering models complete the packaging and prepares for implementation. For new solutions, mapping is the analysis effort of deciding on the implementation mode for the events with the nodes already defined. Impact analyses or changes are recorded as a set of events that needs to be added or deleted or enhanced in terms of the information content. The mapping information is used to create the traced impact on the engineering model elements affected and forms the basis for the changes to be engineered into an existing solution. This component initiates the changes at the process-function level and can go in-depth until the business rules are implemented inside the software.

For a typical application, changes that can impact events at the process and/or activity level provide information for probing impact at the levels below. There can be changes which attribute to the flow and the node in specific. The specification of this attribute provides the connectors to be involved at both ends in an event-managed impact analysis. Subscription and publishing of the information is affected in this impact.

The user has the option of taking up the impacted change provided as side impact or ignoring the suggested changes, based on his ability to assess the impact. An example of impact at the activity level would be flow change. This change flow will may result in user interface(s) that may have addition or deletion of controls/elements in the presentation and subsequent use of the data from these controls/elements in the processing area. So if it impacts the processing further down, the impact is identified by its engineering nodes that need modification. Implementation using business logic may change to accommodate this accepted/suggested modification.

In a case where the leave-management function interacts with the employee-handling function, there could be a change envisaged that the employee eligibility for different leaves is based on an employee type. This may leads to a change in the signature of the IE event connecting leave management and employee handling. This change in the event at the function interaction level is used to find the possible impact at other levels based on the mapping of this information exchange event at a function level to its implementation details and also to the events at activity, user-interface levels. This may lead to a change in the data exchange between the two user interfaces and also change in the service signature of the leave eligibility service.

The following advantages may result: a single context relevant diagram/syntax may be used for representing a business architecture. Its formal structure provides for persisting the business-architecture specification. Persistence is the storing of the specifications in a data base system so that it may be used by others at any other point in time. This results in a persistent blueprint for driving software engineering and the roll out of the finished information systems. It also allows business-impact analysis and implementation independence.

FIG. 2 is a block diagram depicting a system 200 having a server 202 in accordance with one example embodiment of the present invention. The server 202 includes a processor 204 and a memory 206 coupled to the processor. The memory 206 includes a set of processing modules to handle changes to a software system in a business environment. The set of processing modules may include a change requests module 208, an impact analysis module 210, and a software structure schema 212. Further as shown in FIG. 2, the software structure schema 212 includes a knowledge repository 214.

In the example embodiment illustrated in FIG. 2, client devices 218A-N communicate with the server 202 through a network 216. For example, the client devices 218A-N communicate with the server 202 using a data transfer protocol. For example, the communications may be a serial connection, a modem connection, a hard-wired connection and a network connection.

While the example embodiment disclosed herein uses a client-server architecture, one skilled in the art will recognize that other architectures including a single processing system including all of the processing modules as well as a distributed processing system having a collection of different processing systems for each of the processing functions may be utilized without departing from the present invention as recited within the attached claims.

In one embodiment, the software structure schema 212 stores different layers that define a software system in a business environment. In one example embodiment, the layers include application or business-software architecture, technical or design architecture, and building blocks and customization. Further, the software structure schema 212 is configured to store customer requirements of the software system. In one example embodiment, the customer requirements are captured through triggered events.

Furthermore, the software structure schema 212 models the business-software architecture of the software system in a first level of the schema as business functions, business activities, forms, actions, and business rules. In these embodiments, each of the business functions includes functions performed in a business process of the software system. Each of the business activities includes activities performed in each of the business functions. Each of the forms includes semantics to capture and retrieve information for each of the business activities. Each of the actions comprises tasks performed in each of the forms. Each of the business rules comprises rules that govern each of the actions.

Also, the software structure schema 212 models the design architecture of the software system in a second level of the schema as components, system entry points, user interfaces, services, and methods. In these embodiments, each of the components corresponds to each of the business functions of the business process. Each of the system entry points corresponds to visual-interface elements of each of the business activities. Each of the user interfaces with visual-interface elements corresponds to each of the forms. Each of the services corresponds to each of the actions performed in each of the user interfaces. Each of the methods corresponds to each of the business rules that are invoked in handling each of the services.

Moreover, the software structure schema 212 defines events that connect the first level and second level of the schema. In one example embodiment, event includes entry events and exit events. Each of the entry events is a stimulus that triggers a business function, a business activity, or a form. Each of the exit events is a response from the respective business function, business activity, or form to the stimulus.

Further, the software structure schema 212 defines links that represent interactions between the user interfaces. In one example embodiment, each of the links includes cross connections between the visual-interface elements in the user interfaces and the events associated with at least one the business functions, business activities, and forms. Also, the software structure schema 212 defines integration services for each of the events. In one example embodiment, the integration services define cross connections for data updates between the events associated with at least one the business functions, business activities, and forms in the first level and services and methods in the second level.

Further, the software structure schema 212 maps each of the business functions, business activities, forms, actions, and business rules in the first level to a corresponding one of the components, system entry points, user interfaces, services, and methods in the second level using the events, links and integration services.

Furthermore, the knowledge repository 214 creates and stores a traversable user interface representing the mappings between the first level and the second level of the schema. In one example embodiment, the mappings between the first level and the second level of the schema includes connections between each of the business functions, business activities, forms, actions, and business rules in the first level and the corresponding one of the components, system entry points, user interfaces, services, and methods in the second level.

Further, the change requests module 208 identifies changes to the software system in the business environment. In one embodiment, the changes are associated with the business functions, business activities, forms, actions, and/or business rules. Furthermore, the impact analysis module 210 analyzes impact of the changes to the software system using the knowledge repository 214 with the traversable user interface. In these embodiments, the impact analysis module 210 examines proper technology mapping in response to the changes using the knowledge repository 214.

Also, the impact analysis module 210 changes the impacted items based on the changes identified. In addition, the impact analysis module 210 further generates artifacts of one or more of the impacted items, and associates the artifacts with the repository elements in a maintenance management system. In one example embodiment, the artifacts include data structure artifacts, user-interface artifacts, and application service artifacts. These artifacts form the third layer of the software system.

In one exemplary implementation, the software structure schema 212 includes data structure artifacts generated from the events and the components, user-interface artifacts generated from the entry points and the user interfaces, and application service artifacts generated from the services and the methods.

In addition, the impact analysis module 210 defines a set of error conditions and generates application service artifacts from the error conditions.

Figure 3:
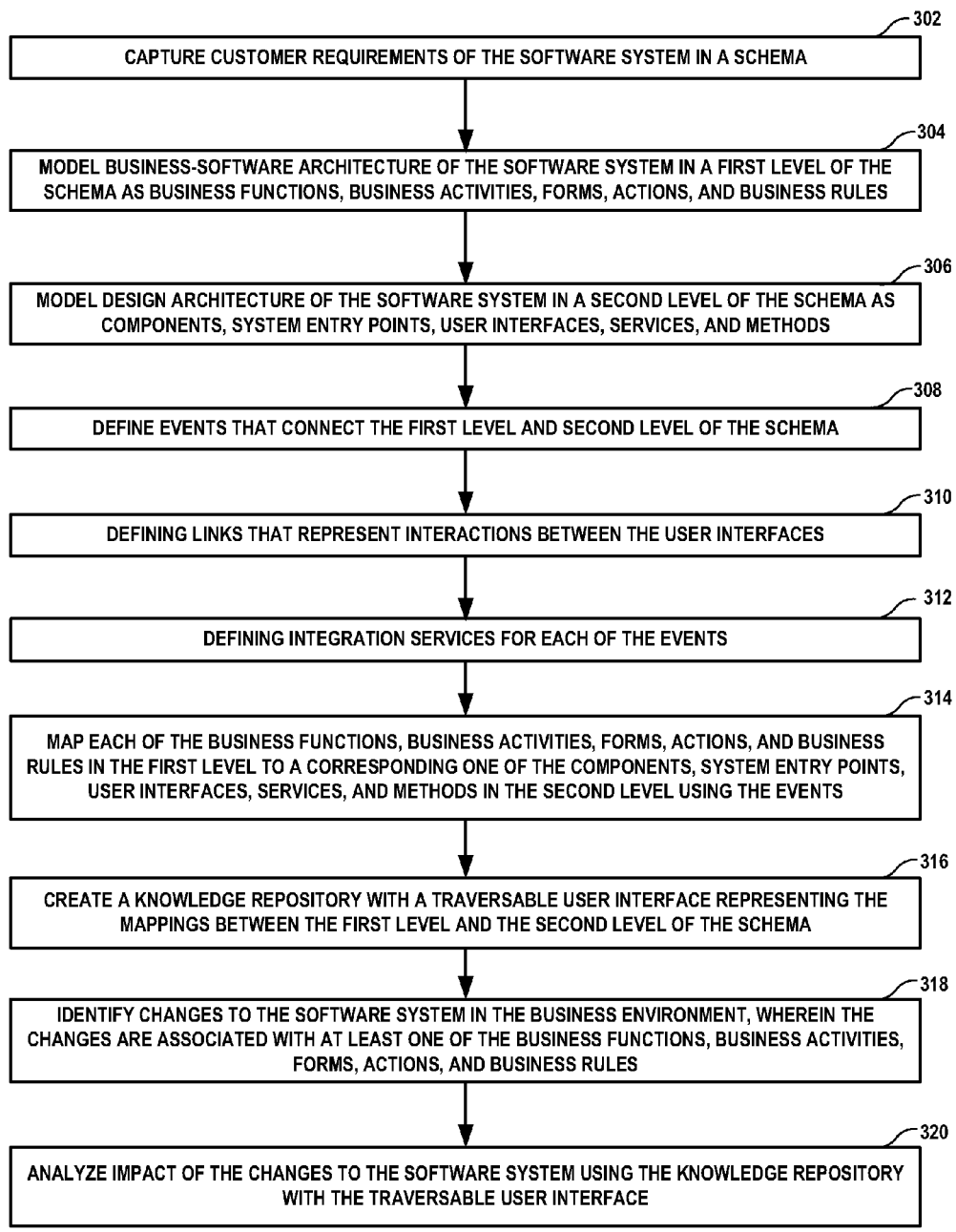
FIG. 3 is a process flowchart illustrating a method for handling changes to a software system in a business environment, according to one embodiment.

FIG. 3 is a process flowchart 300 illustrating a method for handling changes to a software system in a business environment, according to one embodiment. In operation 302, customer requirements of the software system are captured in a schema. In one example embodiment, the customer requirements are captured through triggered events. In operation 304, business-software architecture of the software system is modeled in a first level of the schema as business functions, business activities, forms, actions, and business rules. In these embodiments, each of the business functions represents functions performed in a business process of the software system, each of the business activities represents activities performed in each of the business functions, each of the forms includes semantics to capture and retrieve information for each of the business activities, each of the actions includes tasks performed in each of the forms, and each of the business rules includes rules that govern each of the actions.

In operation 306, design architecture of the software system is modeled in a second level of the schema as components, system entry points, user interfaces, services, and methods. In these embodiments, each of the components corresponds to each of the business functions of the business process, each of the system entry points corresponds to visual-interface elements of each of the business activities, and each of the user interfaces with visual-interface elements corresponds to each of the forms. Further, each of the services corresponds to each of the actions performed in each of the user interfaces, and each of the methods corresponds to each of the business rules that are invoked in handling each of the services.

In operation 308, events that connect the first level and second level of the schema are defined. In one example embodiment, the events include entry events and exit events. In these embodiments, each of the entry events is a stimulus that triggers a business function, a business activity, or a form and each of the exit events is a response from the respective business function, business activity, or form to the stimulus.

In operation 310, links that represent interactions between the user interfaces are defined. In one example embodiment, each of the links includes cross connections between the visual-interface elements in the user interfaces and the events associated with at least one the business functions, business activities, and forms.

In operation 312, integration services are defined for each of the events. In one example embodiment, integration services define cross connections for data updates between the events associated with at least one the business functions, business activities, and forms in the first level and services and methods in the second level.

In operation 314, each of the business functions, business activities, forms, actions, and business rules in the first level is mapped to a corresponding one of the components, system entry points, user interfaces, services, and methods in the second level using the events, links and integration services. In step 316, a knowledge repository with a traversable user interface representing the mappings between the first level and the second level of the schema is created.

In step 318, changes to the software system are identified in the business environment. In one embodiment, the changes are associated with at least one of the business functions, business activities, forms, actions, and business rules.

In one example embodiment, consider that the changes are associated with at least one business function. In this case, the business activities, forms, actions, and business rules associated with the at least one business function can be changed. Further, the components corresponding to the at least one business function can be changed. The change in the components may in turn changes the associated system entry points, user interfaces, services, and methods associated with the changes in the components. Also, the changes in the business activities, forms, actions, and business rules associated with the at least one business function may in turn changes the respective system entry points, user interfaces, services, and methods.

Therefore, changes in business activities, forms, actions, and business rules associated with the at least one business function are identified through mappings persisted in the knowledge repository. Further, changes in components corresponding to the at least one business function are identified. Furthermore, changes in system entry points, user interfaces, services, and methods associated with the changes in the components are identified through mappings persisted in the knowledge repository. Also, changes in system entry points, user interfaces, services, and methods corresponding to the changes in the business activities, forms, actions, and business rules are identified through mappings persisted in the knowledge repository.

In another example embodiment, identifying the changes associated with at least one business activity includes identifying changes in forms, actions, and business rules associated with the at least one business activity through mappings persisted in the knowledge repository, identifying changes in system entry points corresponding to the at least one business activity and further identifying changes in user interfaces, services, and methods associated with the changes in the system entry points through mappings persisted in the knowledge repository, and identifying changes in user interfaces, services, and methods corresponding to the changes in the forms, actions, and business rules through mappings persisted in the knowledge repository.

In yet another example embodiment, identifying the changes associated with at least one form includes identifying changes in actions and business rules associated with the at least one form through mappings persisted in the knowledge repository, identifying changes in user interfaces corresponding to the at least one form and further identifying changes in links, services and methods associated with the changes in the user interfaces through mappings persisted in the knowledge repository, and identifying changes in services, and methods corresponding to the changes in the actions and business rules through mappings persisted in the knowledge repository.

In yet another example embodiment, identifying the changes associated with at least one action includes identifying changes in business rules associated with the at least one action through mappings persisted in the knowledge repository, identifying changes in services corresponding to the at least one action and further identifying changes in integration services and methods associated with the changes in the services through mappings persisted in the knowledge repository, and identifying changes in methods corresponding to the changes in the business rules through mappings persisted in the knowledge repository.

In yet another example embodiment, identifying the changes associated with at least one business rule includes identifying changes in methods corresponding to the changes in business rules through mappings persisted in the knowledge repository, and identifying changes in integration services associated with the changes in the methods.

In step 320, impact of the changes to the software system is analyzed using the knowledge repository with the traversable user interface. In one example embodiment, the knowledge repository is used to examine proper technology mapping in response to the changes. Further, the impacted items are changed based on the changes identified.

Also, artifacts of one or more of the impacted items can be generated and the artifacts can be associated with the repository elements in a maintenance management system. For example, the artifacts include data structure artifacts, user-interface artifacts, and/or application service artifacts. In one exemplary implementation, data structure artifacts are generated from the events and the components, user-interface artifacts are generated from the system entry points and the user interfaces, and application service artifacts are generated from the services and the methods (e.g., as illustrated in FIG. 1). In addition, a set of error conditions are defined from the methods, and application service artifacts are generated from the error conditions.

In accordance with the above described embodiments with respect to FIG. 2 and FIG. 3, the business process may include payables management, employee management, etc. Further, the example attributes associated with each of the business functions, business activities, forms, actions, and business rules in the first level and the corresponding one of the components, system entry points, user interfaces, services, and methods in the second level associated with the payables management and the employee management is depicted in the following table 2.

TABLE 2

| Element | Example 1 | Example 2 |
| --- | --- | --- |
| Business Process | Payables Management | Employee Management |
| Business Functions | Invoice | Leave Management |
| Business Activities | Create Invoice | Create Leave Request |
| Forms | Create Invoice | Create Leave Request |
| Actions | Create Invoice | Create Leave Request |
| Business Rules | Validate Invoice Date | Validate Leave Balance |
| Events | Update Financial Book | Update Leave Balance |
| Links | View Purchase Order | View Leave Balance |
| Integration Services | Update Financial Book | Update Leave Balance |
| Components | Invoice | Leave Management |
| System Entry Points | Create Invoice | Create Leave Request |
| Services | Create Invoice | Create Leave Request |
| Methods | Validate Invoice Date | Validate Leave Balance |
| Error Conditions | Invalid Invoice Date | Insufficient Leave Balance |
| Data Structure Artifacts | InvoiceSchema.sql (Table Schema) CreateInvoiceHeader.sql (Stored Procedure) | LeaveSchema.sql (Table Schema) CreateLeaveRequest.sql (Stored Procedure) |
| User Interface Artifacts | CreateInvoice.htm CreateInvoice_UserJS.js CreateInvoice.cs (Activity source) CreateInvoice.dll (Activity Deliverable) | CreateLeave Request.htm CreateLeaveRequest_UserJS.js CreateLeaveRequest.cs (Activity source) CreateLeaveRequest.dll (Activity Deliverable) |
| Application Service Artifacts | Invoice.cs (Component Code) Invoice.dll (Component Deliverable) InvoiceServices.cs (Service Code) InvoiceServices.dll (Service Deliverable) | Leave.cs (Component Code) Leave.dll (Component Deliverable) LeaveServices.cs (Service Code) LeaveServices.dll (Service Deliverable) |

As shown in Table 2, an example for business process 108 may include employee management in an organization. The business functions 110 may include leave management associated with the employee. The business activities 112 may include "create leave request". The forms 114 may be defined in terms of show leave request, a screen, and others. The actions 116 may include creating leave request for the employee based on the activity and form. The business rules 118 may include "validate leave balance" to authenticate the leave request of the employee based on the leave request created.

The events 120 may include update leave balance based on the business functions 110, business activities 112, and forms 114. The links 122 may include a link "view leave balance", corresponding to the business activities and forms of the business function "leave management".

The integration services 124 may include updating the leave balance information based on the cross connections between events 120 associated with at least one the business functions, business activities, and forms when creating and validating the leave balance in design architecture level. Further, the examples associated with each of the corresponding components 128, system entry points 130, user interfaces 132, services 134, and methods 136 in the technical and design architecture level can be depicted from the Table 2. Further the error conditions 142 may include "insufficient leave balance" which can be generated based on the outcome of validation of the leave request (methods 136) corresponding to the business rules 118. Also, the data structure artifacts 126, user interface artifacts 138 and application service artifacts 140 associated with the leave management of the employee is shown in Table 2. As described above, changes in any of the attributes of the business-software architecture changes the attributes in the software system. These changes can be analyzed using the mappings stored in the knowledge repository. In one embodiment, the mappings include connections between the attributes in the software system in the business environment.

Figure 4:
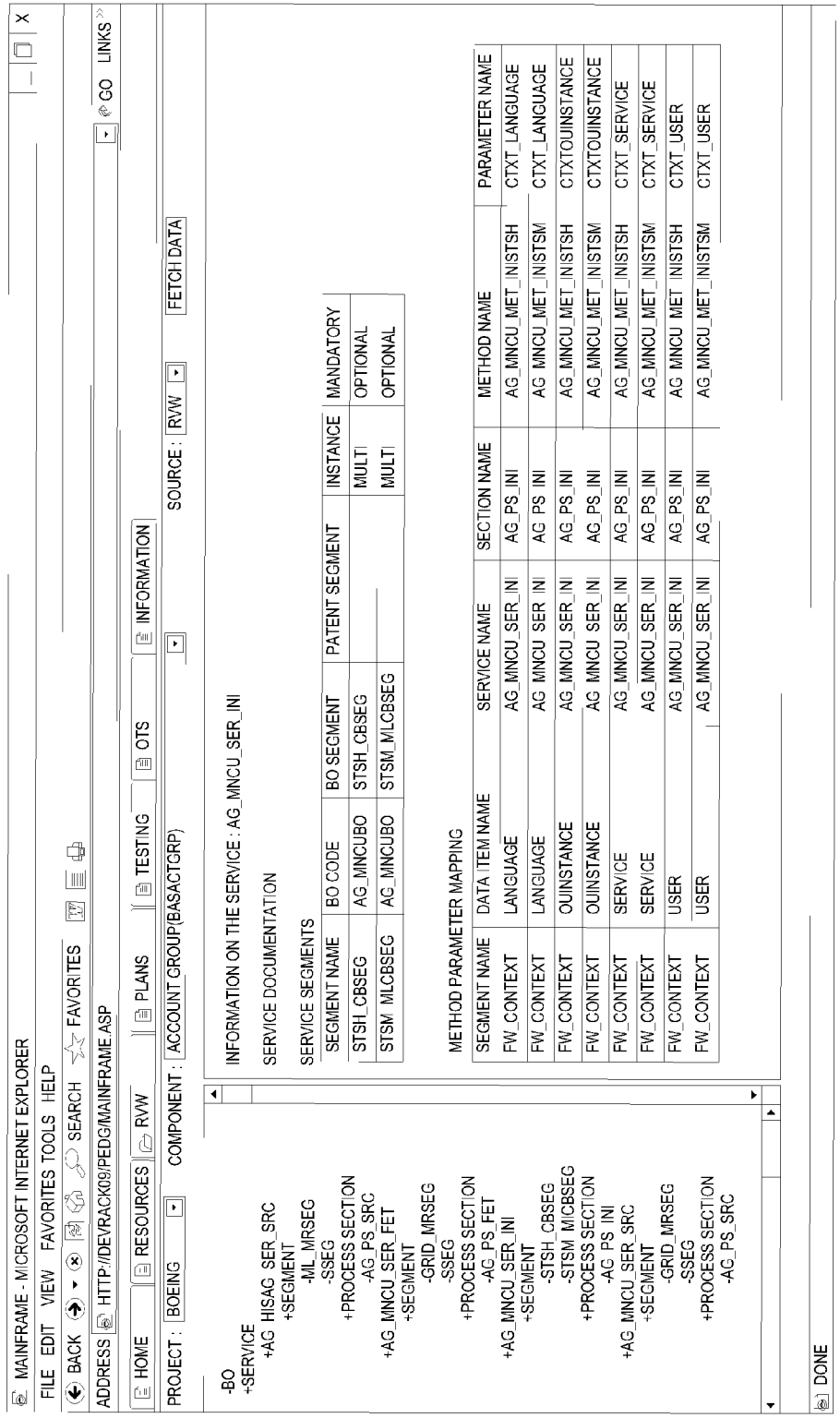
FIG. 4 illustrates an example of a model browser that can be used in connection with an embodiment of the invention.

FIG. 4 illustrates an example of a model browser that can be used in connection with an embodiment of the invention. In one or more embodiments, an integrated model browser is available on a variety of implementations like the Web based model browser or a client/server based model browser. A traversal of such model browsers has multiple entry points, with at least one per process. A user, on selecting a node at a particular point, will have access to all the data required at that level for the node. The user can further drill down into the contents of the node to analyze the next level of information for the node. The user also has a facility to traverse to the related artifact in other processes both upstream and downstream. This provides the user with full control on the information available in the model.

An example related to this embodiment is when a user enters a model browser using the engineering entry point and selects a particular service. The user is provided with all the relevant information for the service. (as illustrated in FIG. 4). The user can choose to traverse higher in the process chain by which the user will be presented with a task which invokes this service. The task is the functional counterpart of any service modeled in the system. The user is also provided with information on the methods invoked by the service along with the stored procedures that are invoked by the methods.

Figure 5:
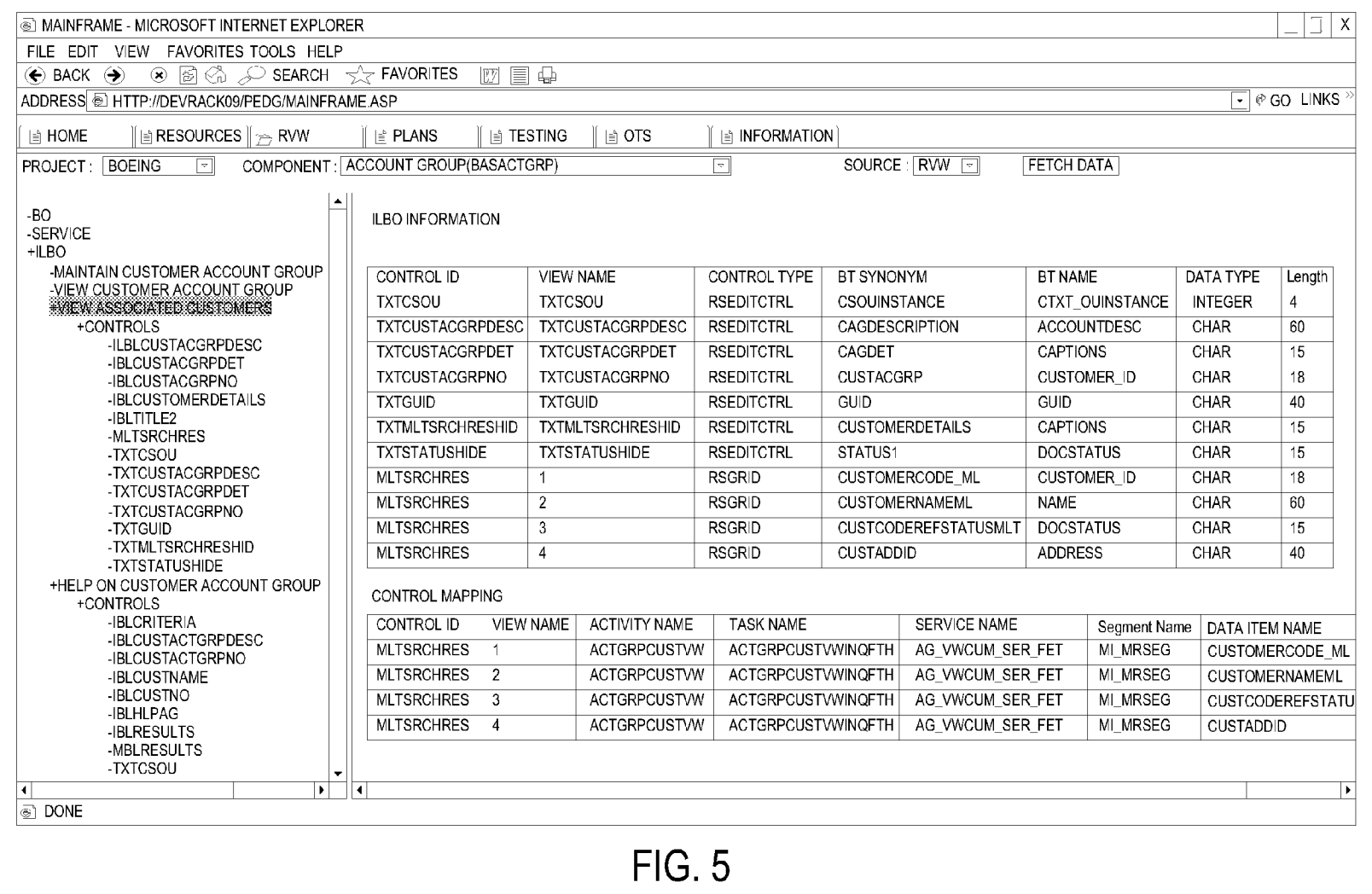

FIG. 5 illustrates another example of a model browser that can be used in connection with an embodiment of the invention. A similar capability to browse the entire model through various entry points is present in an embodiment thereby providing the user with the full flexibility of browsing the various elements of the software structure. The user also can view the related information from the planning, control, and rollout processes.

Similarly, when a user chooses to analyze user interface nodes by accessing the model browser, the browser provides information on the various user interface elements present in the screen. (as shown in FIG. 5). In addition, it provides information on the flow of data from these user interface elements to the design artifacts (services), thereby ensuring complete visibility on data flow across the business processes. And because of the availability of data in the model, various representations of data can be provided on a variety of platforms.

FIG. 6 illustrates an example of an interface reporting the impact status. In another embodiment of the invention, customer requirements are entered into a software system as work requests which form derivable work units. The methodology for capture of these requirements during the problem solving stage is handled mostly through triggered events and responses to triggered events. A good hierarchy set enables a user to choose to enter, probe, or analyze the existing software, or enhance the provided software using an impact analyzer.

Every customer request enters a platform through a record request. Specifically, in this embodiment, the requests allow a user to query the existing software, enhance the existing software, examine problems faced in the existing software, and examine requirements for any new project. This is provided at different points of the software development lifecycle. A facility is provided in a running prototype and fully developed software application to enable a user to enter his view points as requests in the context of the user interface. Once a customer request has been taken up for assignment into a project, it transforms with the same identifier as a work request. Users have a facility to provide clarification and/or suggested brief explanation of the solution as solution comments in another activity. This activity also collects attributes such as accepting the requirement analysis, the level at which analysis is likely to begin, the internal user assigned for this request, and whether this request is a new feature to be recorded. The various problem solution levels one can analyze are process, activity, form, task and flow business rules. New nodes (process, activity, form, task and flow business rules) at these levels can be added too. Change in functional interaction under a process is depicted in the process flow and similar changes can be carried to activity level and form level. Additional points considered in the user interface are screen element changes that could impact the user interface, link interaction that could impact the user interface, and cross impacts on tasks due to impacts from other subsequent processes of the software development lifecycle.

Any change can be identified as flow changes, node changes, additions, and deletions. Initially picked up nodes will be considered in the impacted status "To be analyzed". Once analysis is done the status is changes to "Analyzed". A task button at every node entry point is provided to add the cross impacted nodes to a picked list. This distinction is made available with a column that ensures that only nodes that are not picked up for analysis that form the cross impacted list are added and will have the impact type as "Cross Impacted". Analysis needs to be done as long as the impacted status remains as "Analyzed" for all the nodes in the list under a work request. One more addition to the analysis is the ability to analyze the request for more than one possible solution. Each possible solution can be labeled with different numbers. Each optional solution that is identified is numbered uniquely and analyzed (as shown in FIG. 6).

Figure 7:
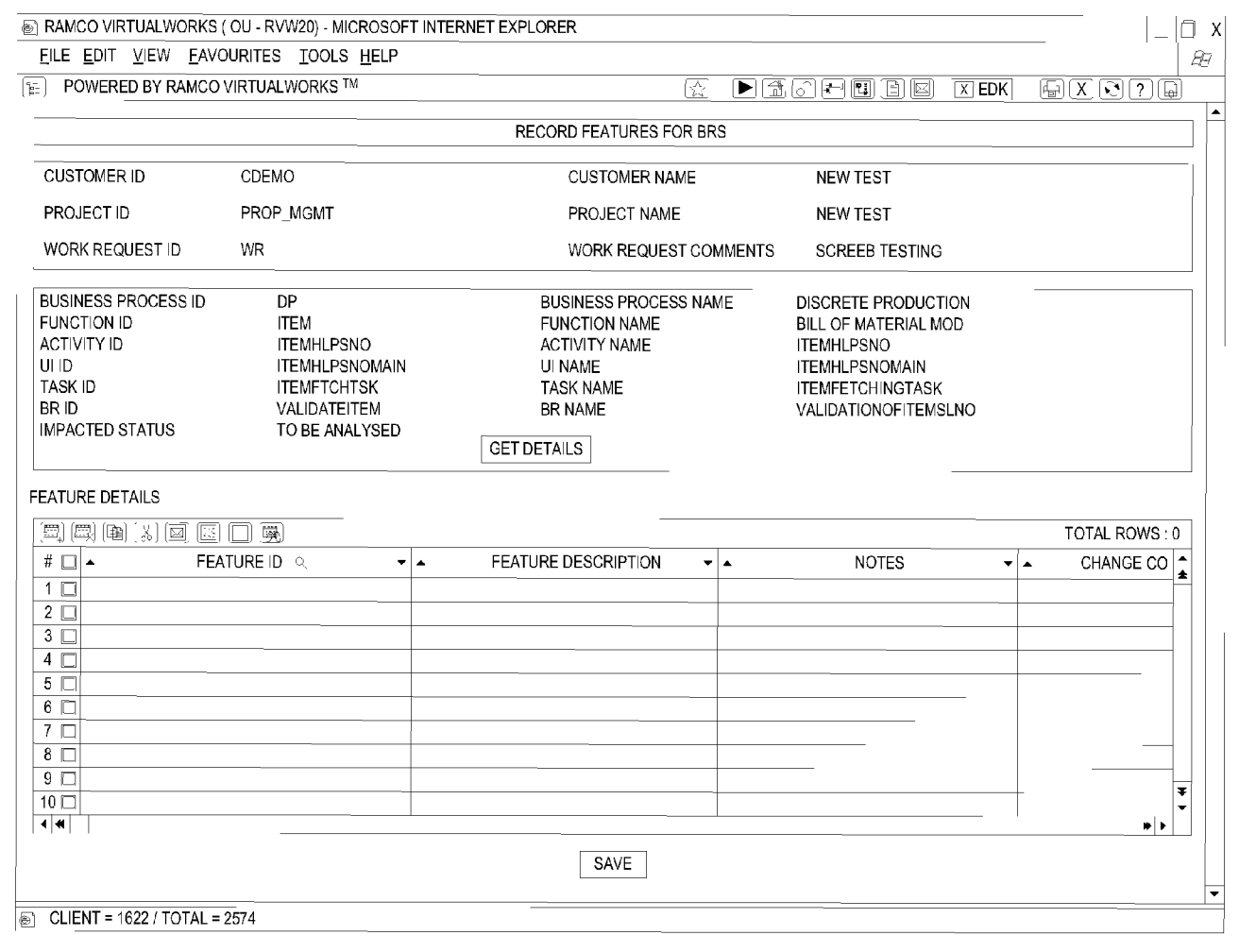

FIG. 7 illustrates another example of an interface reporting the impact status. A user may opt to directly suggest the business rule changes for the existing artifacts or add new rules and proceed for completion of the same. Gap analysis reports to exactly depict the list of changes at multiple stages are provided for ease of verification and work follow up. Features that are collected in a work request provided in each level are allowed to be associated with the nodes. A user continues to analyze until he reaches the status of "analyzed" in all levels of the nodes and the user has no more to analyze in his list. Finalize impact analysis is the last activity that completes and updates the status as completion for a work request. Estimation of the analyzed list of changes for a work request can also be provided prior to real work being executed for the same (as shown in FIG. 7).

Figure 8:
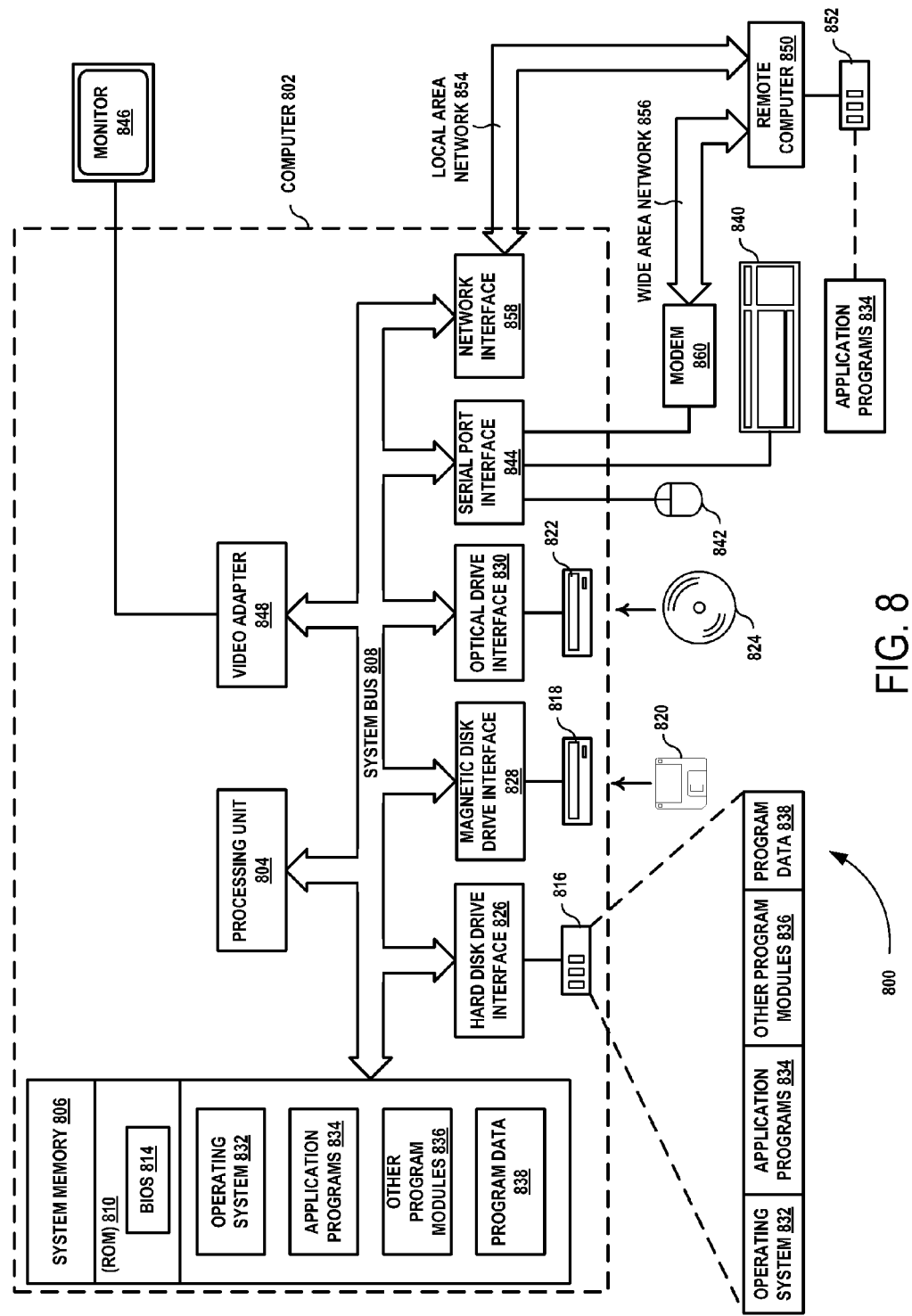
FIG. 8 illustrates a computer system upon which embodiments of the present invention may be implemented.

FIG. 8 is an overview diagram of a hardware and operating environment in conjunction with which embodiments of the invention may be practiced. The description of FIG. 8 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types. In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 802 (e.g., a personal computer, workstation, or server), including one or more processing units 804, a system memory 806, and a system bus 808 that operatively couples various system components including the system memory 806 to the processing unit 804. There may be only one or there may be more than one processing unit 804, such that the processor of the computer 802 comprises a single central-processing unit (CPU), or a plurality of processing units, commonly referred to as a multiprocessor or parallel-processor environment. In various embodiments, the computer 802 is a conventional computer, a distributed computer, or any other type of computer.

The system bus 808 can be any of several types of bus structures including a memory bus or memory controller, a peripheral bus, and a local bus using any of a variety of bus architectures. The system memory 806 can also be referred to as simply the memory, and, in some embodiments, includes read-only memory (ROM) 810 and random-access memory (RAM) 812. A basic input/output system (BIOS) program 814, containing the basic routines that help to transfer information between elements within the computer 802, such as during start-up, may be stored in the ROM 810. The computer 802 further includes a hard disk drive 816 for reading from and writing to a hard disk, not shown, a magnetic disk drive 818 for reading from or writing to a removable magnetic disk 820, and an optical disk drive 822 for reading from or writing to a removable optical disk 824 such as a CD ROM or other optical media.

The hard disk drive 816, the magnetic disk drive 818, and the optical disk drive 822 couple with a hard disk drive interface 826, a magnetic disk drive interface 828, and an optical disk drive interface 830, respectively. The drives and their associated computer-readable media provide non volatile storage of computer-readable instructions, data structures, program modules and other data for the computer 802. It should be appreciated by those skilled in the art that any type of computer-readable media which can store data that is accessible by the computer 802, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk drive 816, magnetic disk drive 818, optical disk drive 822, the ROM 810, or the RAM 812, including an operating system 832, one or more application programs 834, other program modules 836, and program data 838. A plug in containing a security transmission engine for the present invention can be resident on any one or number of these computer-readable media.

A user may enter commands and information into the computer 802 through input devices such as a keyboard 840 and a pointing device 842. Other input devices (not shown) can include a microphone, a joystick, a game pad, a satellite dish, a scanner and the like. These other input devices are often connected to the processing unit 804 through a serial port interface 844 that is coupled to the system bus 808, but can be connected through other interfaces, such as a parallel port, game port, or a universal serial bus (USB). A monitor 846 or other type of display device can also be connected to the system bus 808 via an interface, such as a video adapter 848. The monitor 846 can display a graphical user interface for the user. In addition to the monitor 846, computers typically include other peripheral output devices (not shown), such as speakers and printers.

The computer 802 may operate in a networked environment using logical connections to one or more remote computers or servers, such as a remote computer 850. These logical connections are achieved by a communication device coupled to or a part of the computer 802; the invention is not limited to a particular type of communications device. The remote computer 850 can be another computer, a server, a router, a network PC, a client device, a peer device or other common network node, and typically includes many or all of the elements described above I/O relative to the computer 802, although only a memory storage device 852 has been illustrated. The logical connections depicted in FIG. 8 include a local area network (LAN) 854 and/or a wide area network (WAN) 856. Such networking environments are common place in office networks, enterprise-wide computer networks, intranets and the internet, which are all types of networks.

When used in a LAN-networking environment, the computer 802 is connected to the LAN 854 through a network interface or adapter 858, which is one type of communications device. In some embodiments, when used in a WAN-networking environment, the computer 802 typically includes a modem 860 (another type of communications device) or any other type of communications device, e.g., a wireless transceiver, for establishing communications over the WAN 856, such as the Internet. The modem 860, which may be internal or external, is connected to the system bus 808 via the serial port interface 844.

In a networked environment, program modules depicted relative to the computer 802 can be stored in the remote memory storage device 852 of the remote computer or server 850. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

An article comprising a computer readable storage medium having instructions thereon which when executed by a computing platform result in execution of the above mentioned method. In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of handling changes to a software system in a business environment comprising:
    capturing customer requirements of the software system in a schema;
    modeling business-software architecture of the software system in a first level of the schema as business functions, business activities, forms, actions, and business rules, wherein each of the business functions comprises functions performed in a business process of the software system, wherein each of the business activities comprises activities performed in each of the business functions, wherein each of the forms comprises semantics to capture and retrieve information for each of the business activities, wherein each of the actions comprises tasks performed in each of the forms, and wherein each of the business rules comprises rules that govern each of the actions;
    modeling design architecture of the software system in a second level of the schema as components, system entry points, user interfaces, services, and methods, wherein each of the components corresponds to each of the business functions of the business process, wherein each of the system entry points corresponds to visual-interface elements of each of the business activities, wherein each of the user interfaces with visual-interface elements corresponds to each of the forms, wherein each of the services corresponds to each of the actions performed in each of the user interfaces, and wherein each of the methods corresponds to each of the business rules that are invoked in handling each of the services;

defining events that connect the first level and second level of the schema, wherein events comprise entry events and exit events, and wherein each of the entry events is a stimulus that triggers a business function, a business activity, or a form and each of the exit events is a response from the respective business function, business activity, or form to the stimulus;

defining links that represent interactions between the user interfaces, wherein each of the links comprises cross connections between the visual-interface elements in the user interfaces and the events associated with at least one of the business functions, business activities, and forms;

defining integration services for each of the events, wherein integration services define cross connections for data updates between the events associated with at least one of the business functions, business activities, and forms in the first level and services and methods in the second level;

mapping each of the business functions, business activities, forms, actions, and business rules in the first level to a corresponding one of the components, system entry points, user interfaces, services, and methods in the second level using the events, links, and integration services;

creating a knowledge repository with a traversable user interface representing the mappings between the first level and the second level of the schema;

identifying changes to the software system in the business environment, wherein the changes are associated with at least one of the business functions, business activities, forms, actions, and business rules; and analyzing impact of the changes to the software system using the knowledge repository with the traversable user interface.

2. The method of claim 1, wherein identifying the changes associated with at least one business function comprises:

identifying changes in business activities, forms, actions, and business rules associated with the at least one business function through mappings persisted in the knowledge repository;

identifying changes in components corresponding to the at least one business function and further identifying changes in system entry points, user interfaces, services, and methods associated with the changes in the components through mappings persisted in the knowledge repository; and identifying changes in system entry points, user interfaces, services, and methods corresponding to the changes in the business activities, forms, actions, and business rules through mappings persisted in the knowledge repository.

3. The method of claim 1, wherein identifying the changes associated with at least one business activity comprises:

identifying changes in forms, actions, and business rules associated with the at least one business activity through mappings persisted in the knowledge repository;

identifying changes in system entry points corresponding to the at least one business activity and further identifying changes in user interfaces, services, and methods associated with the changes in the system entry points through mappings persisted in the knowledge repository; and identifying changes in user interfaces, services, and methods corresponding to the changes in the forms, actions, and business rules through mappings persisted in the knowledge repository.

4. The method of claim 1, wherein identifying the changes associated with at least one form comprises:

identifying changes in actions and business rules associated with the at least one form through mappings persisted in the knowledge repository;

identifying changes in user interfaces corresponding to the at least one form and further identifying changes in links, services and methods associated with the changes in the user interfaces through mappings persisted in the knowledge repository; and identifying changes in services, and methods corresponding to the changes in the actions and business rules through mappings persisted in the knowledge repository.

5. The method of claim 1, wherein identifying the changes associated with at least one action comprises:

identifying changes in business rules associated with the at least one action through mappings persisted in the knowledge repository;

identifying changes in services corresponding to the at least one action and further identifying changes in integration services and methods associated with the changes in the services through mappings persisted in the knowledge repository; and identifying changes in methods corresponding to the changes in the business rules through mappings persisted in the knowledge repository.

6. The method of claim 1, wherein identifying the changes associated with at least one business rule comprises:

identifying changes in methods corresponding to the changes in business rules through mappings persisted in the knowledge repository; and identifying changes in integration services associated with the changes in the methods.

7. The method of claim 1, further comprising using the knowledge repository to examine proper technology mapping in response to the changes.

8. The method of claim 7, further comprising changing the impacted items based on the changes identified.

9. The method of claim 7, further comprising:

generating artifacts of one or more of the impacted items; and associating the artifacts with the repository elements in a maintenance management system.

10. The method of claim 1, wherein the customer requirements are captured through triggered events.

11. The method of claim 1, further comprising:

generating data structure artifacts from the events and the components;

generating user-interface artifacts from the entry points and the user interfaces; and generating application service artifacts from the services and the methods.

12. The method of claim 1, further comprising:

defining a set of error conditions; and generating application service artifacts from the error conditions.

13. A system comprising:
a processing unit;
a memory operatively coupled to the processing unit, wherein the memory comprises:
a software structure schema, wherein the software structure schema stores layers that define a software system in a business environment, wherein the software structure schema is configured to
store customer requirements of the software system;
model business-software architecture of the software system in a first level of the schema as business functions, business activities, forms, actions, and business rules, wherein each of the business functions comprises functions performed in a business process of the software system, wherein each of the business activities comprises activities performed in each of the business functions, wherein each of the forms comprises semantics to capture and retrieve information for each of the business activities, wherein each of the actions comprises tasks performed in each of the forms, and wherein each of the business rules comprises rules that govern each of the actions;
model design architecture of the software system in a second level of the schema as components, system entry points, user interfaces, services, and methods, wherein each of the components corresponds to each of the business functions of the business process, wherein each of the system entry points corresponds to visual-interface elements of each of the business activities, wherein each of the user interfaces with visual-interface elements corresponds to each of the forms, wherein each of the services corresponds to each of the actions performed in each of the user interfaces, and wherein each of the methods corresponds to each of the business rules that are invoked in handling each of the services;
define events that connect the first level and second level of the schema, wherein event comprises entry events and exit events, and wherein each of the entry events is a stimulus that triggers a business function, a business activity, or a form and each of the exit events is a response from the respective business function, business activity, or form to the stimulus;
define links that represent interactions between the user interfaces, wherein each of the links comprises cross connections between the visual-interface elements in the user interfaces and the events associated with at least one of the business functions, business activities, and forms;
define integration services for each of the events, wherein integration services define cross connections for data updates between the events associated with at least one of the business functions, business activities, and forms in the first level and services and methods in the second level; and
map each of the business functions, business activities, forms, actions, and business rules in the first level to a corresponding one of the components, system entry points, user interfaces, services, and methods in the second level using the events, links and integration services;
a knowledge repository to create and store a traversable user interface representing the mappings between the first level and the second level of the schema;
a change requests module to identify changes to the software system in the business environment, wherein the changes are associated with at least one of the business functions, business activities, forms, actions, and business rules; and
an impact analysis module to analyze impact of the changes to the software system using the knowledge repository with the traversable user interface.

14. The system of claim 13, wherein the impact analysis module examines proper technology mapping in response to the changes using the knowledge repository.

15. The system of claim 14, wherein the impact analysis module further changes the impacted items based on the changes identified.

16. The system of claim 15, wherein the impact analysis module further generates artifacts of one or more of the impacted items, and associates the artifacts with the repository elements in a maintenance management system.

17. The system of claim 13, wherein the customer requirements are captured through triggered events.

18. The system of claim 13, wherein the software structure schema comprises data structure artifacts generated from the events and the components, user-interface artifacts generated from the entry points and the user interfaces, and application service artifacts generated from the services and the methods.

19. The system of claim 13, the impact analysis module defines a set of error conditions and generates application service artifacts from the error conditions.

20. An article comprising a non-transitory computer readable storage medium having instructions thereon which when executed by a computing platform result in execution of a method of handling changes to a software system in a business environment, comprising:
capturing customer requirements of the software system in a schema;
modeling business-software architecture of the software system in a first level of the schema as business functions, business activities, forms, actions, and business rules, wherein each of the business functions comprises functions performed in a business process of the software system, wherein each of the business activities comprises activities performed in each of the business functions, wherein each of the forms comprises semantics to capture and retrieve information for each of the business activities, wherein each of the actions comprises tasks performed in each of the forms, and wherein each of the business rules comprises rules that govern each of the actions;
modeling design architecture of the software system in a second level of the schema as components, system entry points, user interfaces, services, and methods, wherein each of the components corresponds to each of the business functions of the business process, wherein each of the system entry points corresponds to visual-interface elements of each of the business activities, wherein each of the user interfaces with visual-interface elements corresponds to each of the forms, wherein each of the services corresponds to each of the actions performed in each of the user interfaces, and wherein each of the methods correspond to each of the business rules that are invoked in handling each of the services;
defining events that connect the first level and second level of the schema, wherein events comprise entry events and exit events, and wherein each of the entry events is a stimulus that triggers a business function, a business activity, or a form and each of the exit events is a response from the respective business function, business activity, or form to the stimulus;
defining links that represent interactions between the user interfaces, wherein each of the links comprises cross connections between the visual-interface elements in the user interfaces and the events associated with at least one of the business functions, business activities, and forms;

defining integration services for each of the events, wherein integration services define cross connections for data updates between the events associated with at least one of the business functions, business activities, and forms in the first level and services and methods in the second level;

mapping each of the business functions, business activities, forms, actions, and business rules in the first level to a corresponding one of the components, system entry points, user interfaces, services, and methods in the second level using the events, links and integration services;

creating a knowledge repository with a traversable user interface representing the mappings between the first level and the second level of the schema;

identifying changes to the software system in the business environment, wherein the changes are associated with at least one of the business functions, business activities, forms, actions, and business rules; and analyzing impact of the changes to the software system using the knowledge repository with the traversable user interface.

* * * * *

UNITED STATES PATENT AND TRADEMARK OFFICE
CERTIFICATE OF CORRECTION

PATENT NO. : 8,209,660 B2  
APPLICATION NO. : 12/616835  
DATED : June 26, 2012  
INVENTOR(S) : Parthasarathy Sundararajan et al.

Page 1 of 1

It is certified that error appears in the above-identified patent and that said Letters Patent is hereby corrected as shown below:

On the Title page, Item (75)

(i) The first named Inventor in the bibliographic sheet should read as:

"Parthasarathy Sundararajan"

instead of

"Partasarathy Sundararajan"

(ii) Column 1, line 3 and 4 under Related Applications should read as:

"Parthasarathy Sundararajan et al.,"

instead of

"Partasarathy Sundararajan et al.,"

Signed and Sealed this  
Eighth Day of January, 2013

David J. Kappos  
*Director of the United States Patent and Trademark Office*